United States Patent Office 3,227,603
Patented Jan. 4, 1966

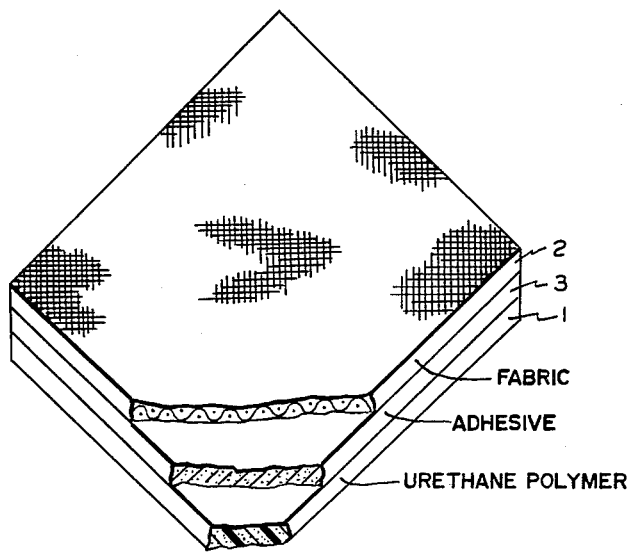

3,227,603
LAMINATING ADHESIVES, LAMINATING
PROCESS AND LAMINATED PRODUCTS
Eugene Kraiman, Cedar Grove, N.J., assignor to Sun
Chemical Corporation, New York, N.Y., a corporation of Delaware
Filed Mar. 2, 1962, Ser. No. 176,904
6 Claims. (Cl. 161—160)

This invention relates to a novel process for laminating textile fabrics to urethane polymer sheets relates to laminated products obtained thereby and relates to novel adhesives for laminating textile fabrics to urethane polymers.

Foamed urethane polymers are particularly useful when laminated to a textile fabric as a garment lining or a carpet underlay. Adhesive compounds such as those formulated from starch, dextrin, albumin, animal glue, and other naturally occurring substances are unsuitable for laminating fabrics to foamed urethane polymers in that such adhesive compounds are subject to mold and/or insect attack. Other types of adhesive compounds heretofore developed and employed for bonding textile fabrics to foamed urethane polymers tend to stiffen the fabric, objectionably reduce or eliminate porosity of the fabric, cannot be used on fabrics finished with various textile resins and chemicals for imparting water repellency, crease resistance, surface effects, and the like, and/or fail to endure dry cleaning or laundering operations. The recently developed procedures, commonly called flame lamination, are also subject to one or more of the above-mentioned failings, and in particular are ineffective in laminating a fabric carrying a finish for providing water repellency, crease resistance, surface effects, and the like. Heretofore known adhesives for laminating textile fabrics to foamed urethane polymers are characterized by one or more of the following shortcomings:

(1) Are of high viscosity;
(2) Employ polymeric or high molecular weight materials;
(3) Require a solvent, or water in the case of emulsions;
(4) Are of the two component type requiring mixing just prior to use;
(5) Are unstable for prolonged periods at ambient temperatures;
(6) Require curing temperatures above decomposition or melting temperatures of many fabrics; and/or
(7) Require the use of large amounts for effectiveness, thus stiffening the fabric and adversely affecting its hand.

It is therefore an object of this invention to provide a novel laminating adhesive and process to produce laminated fabrics which are permanently durable to dry cleaning and washing.

A further object is the provision of a laminating adhesive and process for producing laminated fabrics characterized by substantially the same degree of porosity and softness of hand as the original components prior to lamination.

A further object is the provision of a novel laminating adhesive and process which can be successfully employed on all types of fabrics which are untreated or treated with textile finishing chemicals, e.g., silicones, wax water repellents, and the various cross-linking agents including aminoplasts, sulfones, and the like.

A further object of this invention is the provision of a novel laminating adhesive which is of low viscosity, solvent-free, stable for prolonged periods at ambient temperatures, does not require measuring and intermixing prior to use, and can be rapidly cured at temperatures well below the decomposition or melting temperatures of the fabric or urethane polymer employed.

FIG. 1 is a partially sectionalized perspective view of a laminated urethane polymer and fabric containing an adhesive composition therebetween.

The novel adhesive of this invention comprises a mixture of a liquid organic polyepoxide, a liquid polyalkylene glycol and a boron trihalide-organic amine complex catalyst. The adhesive can be applied to either the urethane polymer or the textile fabric or both and the fabric and urethane polymer can be brought together with the novel adhesive therebetween. Preferably, the fabric is preheated, the adhesive is spread on the urethane polymer, and the fabric and the polymer are brought together with the adhesive in between. After the fabric and urethane polymer are brought together with the adhesive therebetween, heat is applied to a sufficient degree and for a sufficient time to cure the adhesive by bringing about interreaction of the glycol with the polyepoxide, in certain cases, along with the chemical reaction of the fabrics and the urethane polymer with the adhesive components or reaction products thereof.

FIG. 1 shows a laminated article comprising a urethane polymer, a fabric and an adhesive composition in exaggerated form in order to further clarify the process for making a laminated article in accordance with the invention.

In FIG. 1 numerals 1 and 2 indicate a urethane polymer sheet and a fabric respectively having the novel adhesive composition 3 therebetween.

The organic polyepoxide employed in the novel adhesives of the invention comprise any liquid organic compound having two or more vicinal-epoxy groups. It is preferred to employ low viscosity polyepoxides or mixtures of high viscosity polyepoxides with low viscosity monoepoxides or polyepoxides. Preferred organic polyepoxides are monomeric, low molecular weight polyepoxides containing carbon, hydrogen, and oxygen, wherein the oxygen is in the form of the vicinal-epoxy oxygen, the ether oxygen, ester oxygen, or any combination of two or more of such oxygens.

The term "epoxide" as employed in the words monoepoxide, diepoxide and/or polyepoxide designates the vicinal-epoxy group

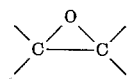

Illustrative examples of suitable organic polyepoxides are 3,4 - epoxy - 6 - methylcyclohexylmethyl - 3,4 - epoxy - 6-methylcyclohexanecarboxylate, butadiene dioxide, diglycidyl ether, dicyclopentadiene dioxide, vinylcyclohexene dioxide, divinylbenzene dioxide, bis(2,3-epoxycyclopentyl)ether, ethylene glycol bis(3,4-epoxymethylcyclohexanecarboxylate), diglycidyl ether of 2,2-bis(4-hydroxyphenyl)propane, epoxidized vegetable oils, and the like. The more viscous organic polyepoxides, e.g., the diglycidyl ether of 2,2-bis(4-hydroxyphenyl)propane, are preferably diluted with the low viscosity polyepoxides, e.g., bis(2,3-epoxycyclopentyl) ether, divinylbenzene dioxide, vinylcyclohexene dioxide, dicyclopentadiene dioxide, and the like.

When polyepoxides are employed, the adhesive is thermosetting. Where thermosetting properties are not desired or necessary, the organic polyepoxides can be replaced in part by monoepoxides, e.g., styrene oxides, epichlorhydrin, and the like.

The polyalkylene glycols employed herein include the polyethylene glycols from ethylene glycol to polyethylene glycol having an approximate molecular weight of 6000, polypropylene glycols including those from propylene glycol to polypropylene glycol having an approximate molecular weight of 6000, mixed polyethylene-polypropylene glycols, glycerol and derivatives of such polyalkylene glycols with glycerol, trimethylol propane, hexane triol, and the like. In instances where increased rigidity is desired or necessary, polyols such as glycerol, trimethylol propane, hexane triol, and the like can be employed in place of the polyalkylene glycol. In those instances where more flexiblity is desired or necessary, the alkylene glycols and low moleceular weight polyalkylene glycols are employed and in those instances where even greater flexibility is desired or necessary, the high molecular weight polyalkylene glycols ar employed.

The ratio of organic polyepoxide to polyalkylene glycol employed herein is not narrowly critical and can be varied over a wide range depending on the particular glycol and polyepoxide employed and whether or not thermosetting properties are desired or necessary. In general, 0.05 to 20 weight parts of plycol per 1 weight part of polyepoxide are preferred. Still more preferred are approximatly 1 to 2 molar equivalent quantities of glycol per molar equivalent quantity of polyepoxide.

The boron trihalides employed in the complex catalysts used herein include boron trifluoride, boron trichloride, and the like. The organic amines employed in the complex catalysts include the primary, secondary, and tertiary organic amines, including triethylamine, ethanolamine, diethanolamine, triethanolamine, ethyl amine, diethylamine, cyclohexamine, butylamine piperidine, pyridine, and the like. Typical boron trifluoride-organic amine complexes are boron trifluoride-triethylamine complex, boron trifluoride-ethylamine complex, boron trifluoride-piperidine complex, and the like.

Catalytic amounts of boron trihalide-organic amines complex catalysts are employed. It is preferable that the maximum amount employed in the adhesive be that which does not exceed the saturation point of the catalyst in the glycol-polyepoxide mixture, such that crystallization of the catalyst does not occur during shipping and storage. Preferred percentages of catalysts generally lie in the range of 0.05 to 20 weight percent of the complex catalyst based on the combined weight of glycol and polyepoxide.

The urethane polymer employed herein includes any of the well known types, including the polyether types and the polyester types. When making laminates for use in garments, draperies, upholsteries, carpet underlays, and the like, it is preferred to employ a urethane polymer of the polyether types since these generally are softer. Foamed urethane polymers are preferred.

An outstanding advantage of this invention is that the novel laminating adhesives and laminating process can be employed on all fabrics, including cotton, rayon, acetate, nylon, zantrel, Dacron, Orlon, wool, and the like. The textile fabric employed herein can also be finished with silicone water repellents, wax type repellents, aminoplast cross-linking agents, sulfone cross-linking agents, and other types of cross-linking agents.

A preferred method for laminating the urethane polymer to the textile fabric is to pre-heat the fabric to an elevated temperature below the decomposition or melting temperature, for example, in the range of 300° to 400° F. The novel adhesive is then applied to the urethane polymer which then is brought into contact with the heated fabric with the adhesive between the fabric and the urethane polymer. The amount of adhesive employed can be widely varied in accordance with the strength and softness desired or necessary. In general, the preferred amount of adhesive lies in the range of one-third to one ounce of adhesive per square yard of laminate to be formed. The larger amounts of adhesive improve the strength of the laminate but reduce the softness and porosity thereof. Adequate laminate strength for most general purposes is obtained with the smaller amounts of adhesive and softness is improved when such smaller amounts are employed. The fabric and urethane polymer are placed together for a sufficient period of time at 300°–400° F. to initially adhere the fabric to the urethane polymer, for example, 10 to 15 seconds. The resulting laminate is then cured for a sufficient period of time and at a sufficient temperature to cause the polyepoxide and glycol to inter-react with each other and with the urethane polymer and fabric. One to 5 minutes is generally adequate at a temperature of 300° to 400° F. Curing time and temperatures, however, should not exceed the decomposition or melting point of the fabric or urethane polymer being laminated.

*Example*

7.5 weight parts of boron trifluoride-ethyl ether complex containing approximately 48% of boron trifluoride and 5.75 weight parts of triethylamine are mixed with 37 weight parts of polyethylene glycol having an average molecular weight of about 600. The triethylamine displaces the ethyl ether and forms a boron trifluoride-triethylamine complex. As an alternative, boron trifluoride gas in substantially the same amount as indicated above can be added to a triethylamine-polyethylene glycol mixture. Still alternatively, the boron trifluoride-triethylamine complex can be prepared prior to mixing with the polyethylene glycol. 49.75 weight parts of 3,4-epoxy-6-methylcyclohexylmethyl-3,4-epoxy - 6 - methylcyclohexanecarboxylate are added to the mixture of polyethylene glycol and boron trifluoride-triethylamine complex and the resulting mixture is well stirred to provide an adhesive of uniform composition. This adhesive is stable for indefinite periods of time during shipping and storing under ambient temperature conditions.

Pieces of cotton, rayon, acetate, nylon, zantrel, Dacron, and wool fabric are each heated to approximately 350° F. Pieces of foamed urethane polymer sheets of the polyether type are coated with the adhesive as prepared above at the rate of one-half ounce per yard. The fabric pieces are then pressed onto the coated urethane polymer sheets with the adhesive between the urethane polymer and the fabric. The urethane polymer-fabric laminates thus formed are pressed together for 10 to 15 seconds at 300°–400° F. Each laminate is then cured for 3 minutes at 350° F.

After cooling, each laminate was tested for durability to dry-cleaning solvents and laundering and found to be unaffected by dry cleaning or laundering. Each laminate had a soft hand and was as porous as the original urethane polymer and fabric from which it was made. The fabric component and urethane polymer component of each laminate could not be separated without tearing the urethane polymer.

What is claimed is:

1. A composite article comprising a cellulosic textile fabric overlying and bonded to a foamed urethane polymer sheet by means of an intermediate bonding phase comprising an adhesive prepared by reacting from 0.05 to 20 weight parts polyethylene glycol having an average molecular weight of 600 with 1 weight part of 3,4-epoxy-6 - methylcyclohexylmethyl - 3,4-epoxy-6-methylcyclohexanecarboxylate in the presence of a catalytic amount of a boron trifluoride-triethylamine complex, said reaction being conducted at a temperature sufficient to cure the adhesive and above the decomposition temperature of the boron trifluoride-triethylamine complex in the reaction mixture.

2. A composite article comprising a cellulosic textile fabric bonded to a foamed urethane polymer by means of an intermediate bonding phase comprising an adhesive prepared by reacting a polyalkylene glycol having a molecular weight up to 6000 with an organic liquid polyepoxide having at least two vicinal epoxy groups in the presence of a catalyic amount of a boron trihalide-organic amine complex, said amine being selected from the group consisting of triethylamine, ethanolamine, diethanolamine, triethanolamine, ethylamine, diethylamine, cyclohexylamine, butylamine, piperidine and pyridine, said reaction being conducted at a temperature sufficient to cure the adhesive and above the decomposition temperature of the boron trihalide-organic amine complex in the reaction mixture.

3. A composite article comprising a cellulosic textile fabric overlying and bonded to a urethane polymer sheet by means of an intermediate bonding phase comprising an adhesive prepared by reacting polyethylene glycol having an average molecular weight of 600 with an organic liquid diepoxide in the presence of a catalytic amount of a boron trihalide-organic amine complex, said amine being selected from the group consisting of triethylamine, ethanolamine, diethanolamine, triethanolamine, ethylamine, diethylamine, cyclohexylamine, butylamine, piperidine and pyridine, said reaction being conducted at a temperature sufficient to cure the adhesive and above the decomposition temperature of the boron trihalide-organic amine complex in the recation mixture.

4. A composite article comprising a cellulosic textile fabric overlying and bonded to a foamed urethane polymer sheet by means of an intermediate bonding phase comprising an adhesive prepared by reacting polyethylene glycol having an average molecular weight of 600 with an organic liquid diepoxide in a weight ratio of 0.05 to 20 parts by weight of glycol per part by weight of diepoxide in the presence of a catalytic amount of a boron trifluoride-organic amine complex, said amine being selected from the group consisting of triethylamine, ethanolamine, diethanolamine, triethanolamine, ethylamine, diethylamine, cyclohexylamine, butylamine, piperidine and pyridine, said reaction being conducted at a temperature sufficient to cure the adhesive and above the decomposition temperature of the boron trifluoride-organic amine complex in the reaction mixture.

5. A method for laminating foamed urethane polymer to a cellulosic textile fabric which comprises interposing between the urethane polymer and cellulosic textile fabric an intermediate bonding phase comprising an adhesive prepared by reacting a polyalkylene glycol having a molecular weight up to 6000 and an organic liquid diepoxide in the presence of from 0.05 to 20 weight percent based on the combined weight of glycol and diepoxide of a boron trihalide-organic amine complex, said amine being selected from the group consisting of triethylamine, ethanolamine, diethanolamine, triethanolamine, ethylamine, diethylamine, cyclohexylamine, butylamine, piperidine and pyridine, and thereafter curing the laminate at a temperature, said reaction being conducted at a temperature sufficient to cure the adhesive and above the decomposition temperature of the boron trihalide-organic amine complex in the reaction mixture.

6. A method for laminating a foamed urethane polymer sheet to a cellulosic textile fabric which comprises interposing between the urethane sheet and textile fabric an intermediate bonding phase in an amount of one-third to one ounce per square yard of fabric surface, said bonding phase comprising an adhesive prepared by reacting polyethylene glycol having an average molecular weight of 600 and 3,4-epoxy-6 - methylcyclohexylmethyl - 3,4-epoxy-6-methylcyclohexanecarboxylate in the presence of 0.05 to 20 weight percent based on the combined weight of glycol and diepoxide of a boron trifluoride-triethylamine complex and thereafter curing the laminate at a temperature, sufficient to cure the adhesive and above the decomposition temperature of the boron trifluoride-triethylamine complex in the reaction mixture.

References Cited by the Examiner

UNITED STATES PATENTS

| | | |
|---|---|---|
| 2,826,240 | 3/1958 | Meier et al. |
| 2,839,495 | 6/1958 | Carey _____ 161—184 X |
| 2,855,021 | 10/1958 | Hoppe et al. _____ 161—190 X |
| 2,890,195 | 6/1959 | Philips et al. _____ 154—45.4 |
| 2,943,009 | 6/1960 | Mirsky et al. |
| 2,957,793 | 10/1960 | Dickey. |
| 3,036,948 | 5/1962 | Danielson _____ 154—46 |
| 3,039,907 | 6/1962 | Scholl _____ 161—190 X |
| 3,042,545 | 7/1962 | Kienle et al. _____ 117—75 |

FOREIGN PATENTS 821,537   10/1959   Great Britain.

OTHER REFERENCES

Potting and Encapsulation, Firth, F. G., Modern Plastics, vol. 33, April 1956, pp. 125–127, 130.

Epoxy Resins, Skeist, Irving, pp. 30, 58 Reinhold, New York City, 1958.

EARL M. BERGERT, *Primary Examiner.*